(12) United States Patent
Ambroladze et al.

(10) Patent No.: US 9,678,848 B2
(45) Date of Patent: *Jun. 13, 2017

(54) ELIMINATE CORRUPTED PORTIONS OF CACHE DURING RUNTIME

(71) Applicant: International Business Machines Corporation, Armonk, NY (US)

(72) Inventors: Ekaterina M. Ambroladze, Los Angeles, CA (US); Michael A. Blake, Wappingers Falls, NY (US); Michael Fee, Cold Spring, NY (US); Arthur J. O'Neill, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,331

(22) Filed: Sep. 7, 2016

(65) Prior Publication Data

US 2016/0364312 A1    Dec. 15, 2016

Related U.S. Application Data

(63) Continuation of application No. 15/097,531, filed on Apr. 13, 2016, now Pat. No. 9,507,660, which is a
(Continued)

(51) Int. Cl.
*G06F 11/00* (2006.01)
*G06F 11/30* (2006.01)
(Continued)

(52) U.S. Cl.
CPC ........ *G06F 11/3037* (2013.01); *G06F 11/073* (2013.01); *G06F 11/076* (2013.01);
(Continued)

(58) Field of Classification Search
USPC .......................................................... 714/6.1
See application file for complete search history.

(56) References Cited

U.S. PATENT DOCUMENTS

| | | |
|---|---|---|
| 5,410,668 A | 4/1995 | Hilton |
| 8,055,960 B2 | 11/2011 | Huott et al. |
| | (Continued) | |

FOREIGN PATENT DOCUMENTS

| | | |
|---|---|---|
| WO | 9510083 | 4/1995 |
| WO | 2007081661 A3 | 7/2007 |
| | (Continued) | |

OTHER PUBLICATIONS

Ansari, et al.; "Maximizing Spare Utilization by Virtually Reorganizing Faulty Cache Lines"; IEEE Transactions on computers; vol. 60; No. 1; Jan. 2011; Copyright 2011.
(Continued)

*Primary Examiner* — Sarai Butler
(74) *Attorney, Agent, or Firm* — Edward J. Wixted, III

(57) ABSTRACT

In an approach for taking corrupt portions of cache offline during runtime, a notification of a section of a cache to be taken offline is received, wherein the section includes one or more sets in one or more indexes of the cache. An indication is associated with each set of the one or more sets in a first index of the one or more indexes, wherein the indication marks the respective set as unusable for future operations. Data is purged from the one or more sets in the first index of the cache. Each set of the one or more sets in the first index is marked as invalid.

1 Claim, 4 Drawing Sheets

Related U.S. Application Data continuation of application No. 14/614,841, filed on Feb. 5, 2015.

(51) Int. Cl.
*G06F 12/0891* (2016.01)
*G06F 11/07* (2006.01)
*G06F 11/08* (2006.01)
*G06F 12/0811* (2016.01)
*G06F 12/128* (2016.01)

(52) U.S. Cl.
CPC ........ *G06F 11/079* (2013.01); *G06F 11/0754* (2013.01); *G06F 11/0793* (2013.01); *G06F 11/08* (2013.01); *G06F 12/0811* (2013.01); *G06F 12/0891* (2013.01); *G06F 12/128* (2013.01); *G06F 2201/85* (2013.01); *G06F 2201/885* (2013.01); *G06F 2212/1032* (2013.01); *G06F 2212/281* (2013.01); *G06F 2212/283* (2013.01); *G06F 2212/608* (2013.01); *G06F 2212/69* (2013.01)

(56) References Cited

U.S. PATENT DOCUMENTS

| | | |
|---|---|---|
| 2005/0283657 A1 | 12/2005 | Nishihara |
| 2008/0163014 A1 | 7/2008 | Crawford et al. |
| 2009/0070532 A1 | 3/2009 | Bussa et al. |
| 2009/0077425 A1* | 3/2009 | Gschwind ........... G06F 11/1064 714/42 |
| 2009/0182953 A1 | 7/2009 | Merkey et al. |
| 2009/0204762 A1 | 8/2009 | Huott et al. |
| 2009/0300413 A1 | 12/2009 | Chang et al. |
| 2010/0088550 A1 | 4/2010 | Imai et al. |
| 2013/0145216 A1* | 6/2013 | Eggers ................ G06F 11/3668 714/38.1 |
| 2013/0179740 A1 | 7/2013 | Jeddeloh |
| 2013/0339785 A1* | 12/2013 | Ambroladze ........... G06F 11/20 714/6.13 |
| 2014/0006849 A1* | 1/2014 | Ramirez ............. G06F 11/2053 714/6.13 |
| 2014/0095926 A1 | 4/2014 | Ambroladze et al. |
| 2016/0004587 A1 | 1/2016 | Agrawal et al. |
| 2016/0232052 A1 | 8/2016 | Ambroladze et al. |
| 2016/0232067 A1 | 8/2016 | Ambroladze et al. |

FOREIGN PATENT DOCUMENTS

| | | |
|---|---|---|
| WO | 2008106095 A1 | 9/2008 |
| WO | 2009124320 A1 | 10/2009 |

OTHER PUBLICATIONS

Roberts, David Andrew; "Efficient Data Center Architectures Using Non-Volatile Memory and Reliability Techniques"; A dissertation submitted in partial fulfillment of the requirements for the degree of Doctor of Philosophy in The University of Michigan; 2011.

List of IBM Patents or Patent Applications Treated as Related; Sep. 7, 2016; 2 Pages.

* cited by examiner

ELIMINATE CORRUPTED PORTIONS OF CACHE DURING RUNTIME

BACKGROUND

The present invention relates generally to the field of error detection and correction, and more particularly to dynamically eliminating corrupted portions of cache during runtime.

A cache is a component that transparently retains data elements (or simply data) so that future requests for any retained data can be served faster. A data element that is stored within a cache corresponds to a pre-defined storage location within a computer memory system. Such a data element might be a value that has recently been computed or a duplicate copy of the same data element that is also stored elsewhere. If requested data is contained in the cache, this is a cache hit, and the request can be served by simply reading the cache, which is comparatively faster than accessing other storage locations because the cache is usually built close to the respective requester. If the data is not contained in the cache, this is a cache miss, and the data is fetched from higher level cache or system memory (other storage medium) not necessarily as close to the requester, and thus comparatively slower than a cache hit. In general, the greater number of requests that can be served from the cache, the faster the overall system performance.

To ensure the validity of data in the cache, error detection and correction schemes can be used to check the data for errors. Error detection and correction schemes can be either systematic or non-systematic. In a systematic scheme, the transmitter sends the original data and attaches a fixed number of check bits (or parity data) which are derived from the data bits by some deterministic algorithm. If only error detection is required, a receiver can simply apply the same algorithm to the received data bits and compare its output with the received check bits. If the values do not match, an error has occurred at some point.

SUMMARY

Aspects of an embodiment of the present invention disclose a method, computer program product, and computer system for taking corrupt portions of cache offline during runtime. A notification of a section of a cache to be taken offline is received, wherein the section includes one or more sets in one or more indexes of the cache. An indication is associated with each set of the one or more sets in a first index of the one or more indexes, wherein the indication marks the respective set as unusable for future operations. Data is purged from the one or more sets in the first index of the cache. Each set of the one or more sets in the first index is marked as invalid.

DETAILED DESCRIPTION

Embodiments of the present invention recognize that technologies that allow larger and denser static random-access memory (SRAM) and embedded dynamic random-access memory (eDRAM) caches on a single chip can result in an increasing number of physical design errors. Physical errors can include, for example, a stuck bit. These physical errors can corrupt portions of the cache. Embodiments of the present invention provide an approach to identify, remove, and deactivate sections of cache with higher rates of errors, without having to quiesce the system.

The present invention will now be described in detail with reference to the Figures.

Figure 1:
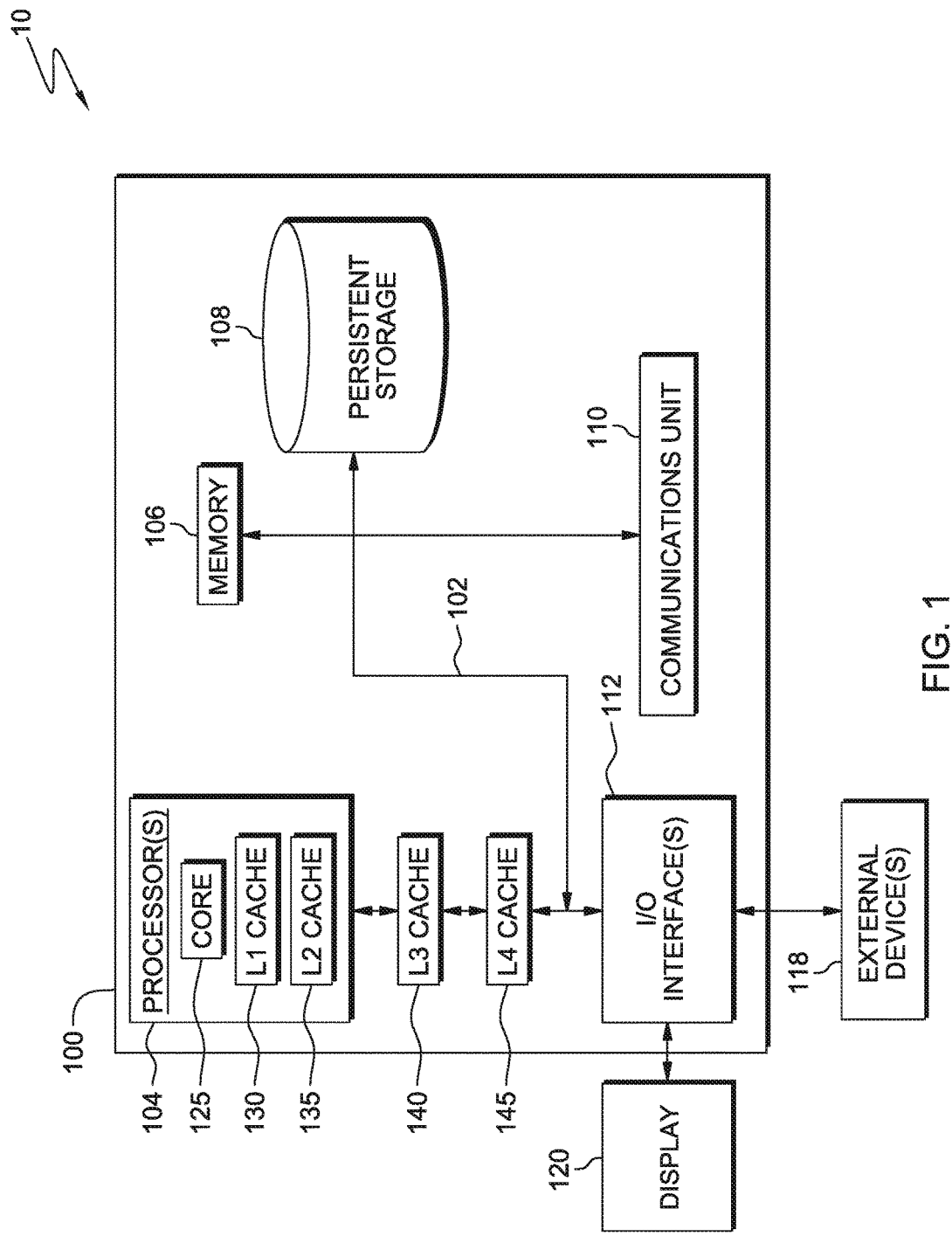
FIG. 1 is a block diagram of a data processing environment, in accordance with one embodiment of the present invention.

FIG. 1 is a functional block diagram illustrating a distributed data processing environment, generally designated 10, in accordance with one embodiment of the present invention. FIG. 1 depicts a block diagram of components of computing device 100, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computing device 100 may be a management server, a web server, or any other electronic device or computing system capable of receiving and sending data, and processing program instructions. In some embodiments, computing device 100 may be a laptop computer, tablet computer, netbook computer, personal computer (PC), a desktop computer, or any programmable electronic device.

Computing device 100 includes communications fabric 102, which provides communications between core 125, cache (e.g., L1 cache 130, L2 cache 135, L3 cache 140, L4 cache 145), memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses or a crossbar switch.

Processor 104 may be a processor with one or more cores (e.g., core 125). In the depicted embodiment, processor 104 includes core 125, L1 cache 130, and L2 cache 135. Processor 104 may include any number of cache levels. Core 125 is an individual central processing unit (CPU) located on processor 104. In embodiments of the present invention, there may be any number of cores 125 within processor 104.

Memory 106 and persistent storage 108 are computer readable storage media. In this embodiment, memory 106 includes random access memory (RAM). In general, memory 106 can include any suitable volatile or non-volatile computer readable storage media.

Figure 2:
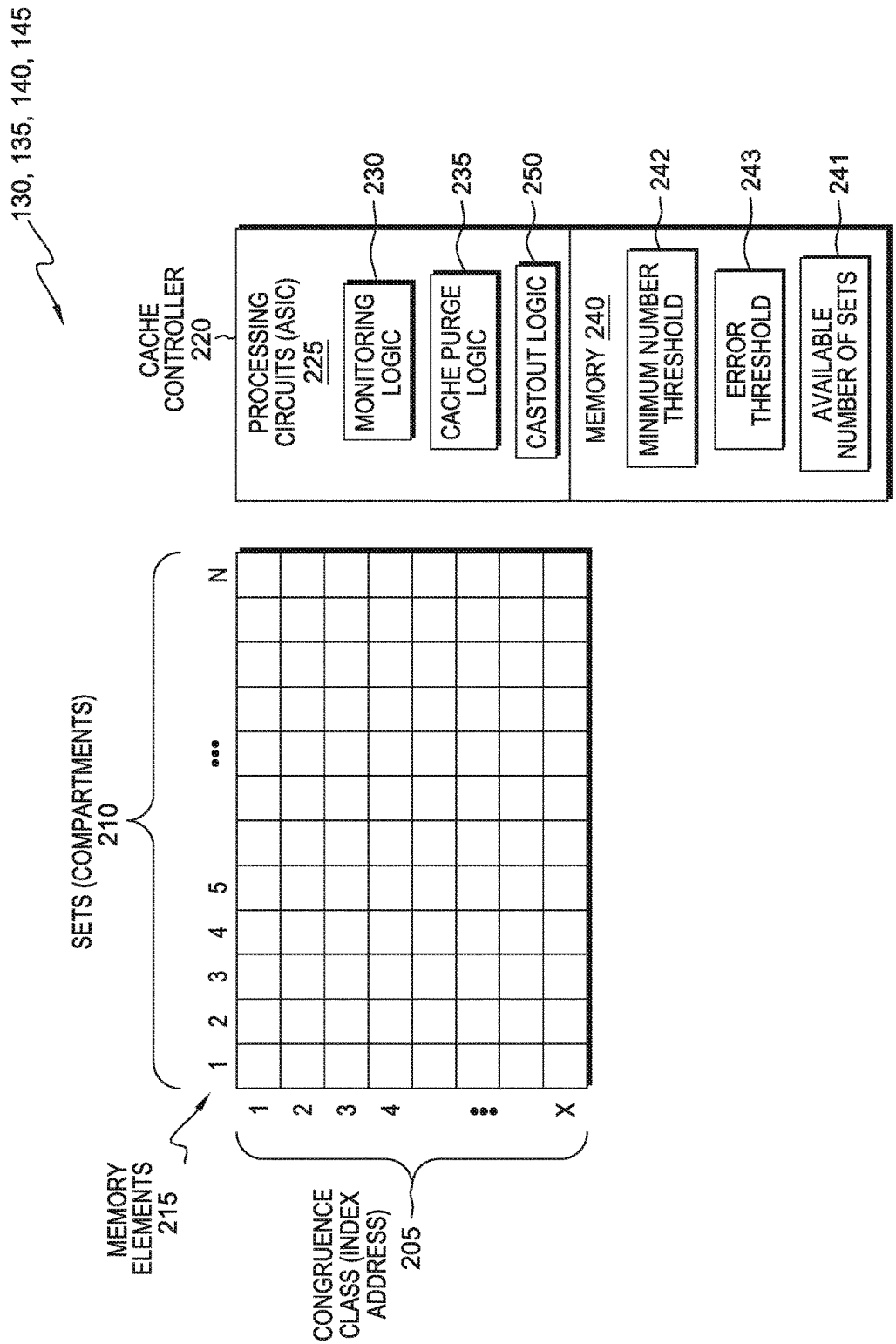
FIG. 2 depicts additional details of the caches, in accordance with one embodiment of the present invention.

Cache (e.g., L1 cache 130, L2 cache 135, L3 cache 140, L4 cache 145) is a fast memory that enhances the performance of computer processor(s) 104 by holding recently accessed data, and data near accessed data, from memory 106. In the depicted embodiment, L1 cache 130 and L2 cache 135 are located on processor 104. In the depicted embodiment, L1 cache 130 and L2 cache 135 are on-processor memory for caching data on processor 104. Processor 104 may be operatively connected to L3 cache 140, which in turn may be operatively connected to L4 cache 145. Data retrieved from memory 106 may be cached in any of the caches (e.g., L1 cache 130, L2 cache 135, L3 cache 140, L4 cache 145). Typically, the cache size increases as the cache level increases while the speed at which data can be accessed decreases as the cache level increases, primarily because lower level caches are located close to core 125 and/or processor 104. In the depicted embodiment, for example, L1 cache 130 is the smallest size cache and is the closest cache to core 125, while L4 cache 145 is the largest size cache and is the furthest away cache from core 125. While the depicted embodiment includes L1 cache 130, L2 cache 135, L3 cache 140, and L4 cache 145, it should be understood that different cache arrangements, in both number of cache levels and location within the system, are recognized by embodiments of the present invention. Further, it is recognized that some cache levels may be dedicated to core 125, while other cache levels are shared between core 125 and additional cores (not shown) of processor 104. FIG. 2 illustrates further details of L1 cache 130, L2 cache 135, L3 cache 140, and/or L4 cache 145, in accordance with an embodiment of the present invention.

Programs may be stored in persistent storage 108 and in memory 106 for execution by one or more of the respective computer processors 104 via L1 cache 130, L2 cache 135, L3 cache 140, and/or L4 cache 145. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Programs may be downloaded to persistent storage 108 through communications unit 110.

I/O interface(s) 112 allows for input and output of data with other devices that may be connected to computing device 100. For example, I/O interface 112 may provide a connection to external devices 118 such as a keyboard, keypad, a touch screen, and/or some other suitable input device. External device(s) 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to a display 120.

Display 120 provides a mechanism to display data to a user and may be, for example, a computer monitor.

FIG. 2 illustrates further details of L1 cache 130, L2 cache 135, L3 cache 140, and/or L4 cache 145, in accordance with one embodiment of the present invention. As discussed herein, reference is made to L3 cache 140. However, the explanation may apply to L1 cache 130, L2 cache 135, and L4 cache 145, in embodiments of the invention.

L3 cache 140 (along with L1 cache 130, L2 cache 135, and L4 cache 145) may be an N-way set associative cache with 1-X congruence classes 205 (shown as rows) and 1-N sets (shown as columns) as understood by one skilled in the art. As discussed herein, each congruence class can also be referred to as an addressable index (or index) 205, and each set 210 can be referred to as a compartment.

In the depicted example, L3 cache 140 is a twelve-way set associative cache. There may be fewer or additional sets 210 in the cache. Twelve sets are used for explanation purposes.

L3 cache 140 has numerous memory elements 215, each of which stores data. The memory elements 215 also referred to as memory cells are integrated circuits for storing data. L3 cache 140 also includes a cache controller 220 that controls loading (writing), evicting, and reading (requesting) data in the memory elements 215 of the L3 cache 140. L3 cache 140 includes a cache directory (not shown) which maintains the state of each set (compartment) 210. Cache controller 220 controls and makes updates to the cache directory as well as memory elements 215.

The cache directory may have, for example, a grid of status indications, where each individual status indication represents a corresponding memory element 215 in the cache (e.g., L1 cache 130, L2 cache 135, L3 cache 140, L4 cache 145). Each set (compartment) 210 has corresponding bits that indicate the status: valid, invalid, empty, owned, offline, not to be used (i.e., killed), etc. Further, the cache directory may indicate various sections within the cache. Such sections may be specified by a bit, and may include compartments from multiple indexes 205.

Cache controller 220 may include processing circuits 225 which may be application specific integrated circuits (ASIC) and various state machines (not shown). A state machine (e.g., finite-state machine (FSM) or finite-state automaton) reads a series of inputs. When the state machine reads an input it will switch to a different state. Each state specifies which state to switch for a given input.

For example, a state machine is a mathematical model used to design computer programs and digital logic circuits. A state machine can be in one of a finite number of states. A state machine is only one state at a time, and the state the state machine is in at any given time is called the current state. The state can change from one state to another when initiated by a triggering event or condition, and this is called a transition. Each particular state machine is defined by a list of the possible transition states from each current state and by the triggering condition for each transition.

Various state machines have different roles that the various state machines are designed to fulfill. Various state machines may be used by a transaction or operation to access data stored in memory elements 215. Various state machines can access memory elements 215 (i.e., access the cache) for processor 100 (e.g., core 125, an application in memory 106)

Cache controller 220 includes memory 240. Memory 240 is a storage location accessible to cache controller 220, and in some embodiments is located on cache controller 220. In the depicted embodiment, memory 240 stores minimum number threshold 242, error threshold 243, and available number of sets 241.

Minimum number threshold 242 is a required number of viable sets (compartments) 210 that must be left in an index 205 for the index 205 to remain viable (i.e., usable). Minimum number threshold 242 may be designated by a user of computing device 100. Alternatively, cache controller 220 may identify a minimum number. Minimum number threshold 242 may be set at one-fourth, one-third, one-half, or any other number of the total original sets 210 that were available when the cache was new. Minimum number threshold 242 may be changed by a user of computing device 100 or cache controller 220.

Error threshold 243 is a number indicating the number of errors, error frequency, or rate of errors that may occur in a section of cache before compartments within the section are to be marked as killed (i.e., not to be used for future operations). Error threshold 243 may be set at a particular number of errors, a particular number of errors during a designated time frame, a rate of error occurrence, or any other way to indicate the occurrence of errors within a section of L3 cache 140. Error threshold 243 may be changed by a user of computing device 100 or cache controller 220.

Available number of sets 241 indicates the number of sets (compartments) 210 available for data storage in one or more indexes 205 of the cache (e.g., L1 cache 130, L2 cache 135, L3 cache 140, L4 cache 145). Cache controller 220, or cache purge logic 235, compares available number of sets 241 to minimum number threshold 242 to determine whether the minimum number of compartments required for a particular index 205, as indicated by minimum number threshold 242, is met.

For each set (compartment) 210, the cache directory contains information about the status indication of the corresponding memory element 215. Each of the directory statuses for sets 1-N in a specific congruence class 205 are read out each time a state machine or logic (e.g., hardware logic, software logic) accesses L3 cache 140. In one embodiment, each of the directory statuses for a section of L3 cache 140 are read out each time a state machine or logic accesses the section of L3 cache 140.

Cache controller 220 includes monitoring logic 230. Monitoring logic 130 operates to identify errors in L3 cache 140 (or L1 cache 130, L2 cache 135, L4 cache 145), and more specifically, identify that the number of errors occurring in a particular section of L3 cache 140 exceed error threshold 243. Monitoring logic 130 also operates to initiate cache purge logic 235. Monitoring logic 230 may be hardware or software logic. In some embodiments, monitoring logic 130 is executed by cache controller 220 which can include various state machines and/or millicode that may be configured to perform the actions.

Cache controller 220 includes cache purge logic 235. Cache purge logic 235 operates to mark sets (compartments) 210 within L3 cache 140 (or L1 cache 130, L2 cache 135, L4 cache 145) indicated by monitoring logic 230 as killed, indicating that the marked sets should not be used for future operations. Cache purge logic 235 also operates to load castout logic 250 for each set 210 marked as killed. Cache purge logic 235 may be hardware or software logic. In some embodiments, cache purge logic 235 is executed by cache controller 220 which can include various state machines and/or millicode that may be configured to perform the actions.

Cache controller 220 includes castout logic 250. Castout logic 250 operates to evict, castout, or purge out data from sets 210 marked as killed within each index 205 of the section of L3 cache 140 (or L1 cache 130, L2 cache 135, L4 cache 145). In general, castout logic 250 sends the data to higher level cache or memory. Castout logic 250 honors the same address compares as basic castouts. Upon casting out data from a set (compartment) 210, castout logic 250 also may operate to mark the set 210 as invalid. In some embodiments, the set 210 is marked invalid within the cache directory. Castout logic 250 may be hardware or software logic. In some embodiments, castout logic 250 is executed by cache controller 220 which can include various state machines and/or millicode that may be configured to perform the actions.

Figure 3:
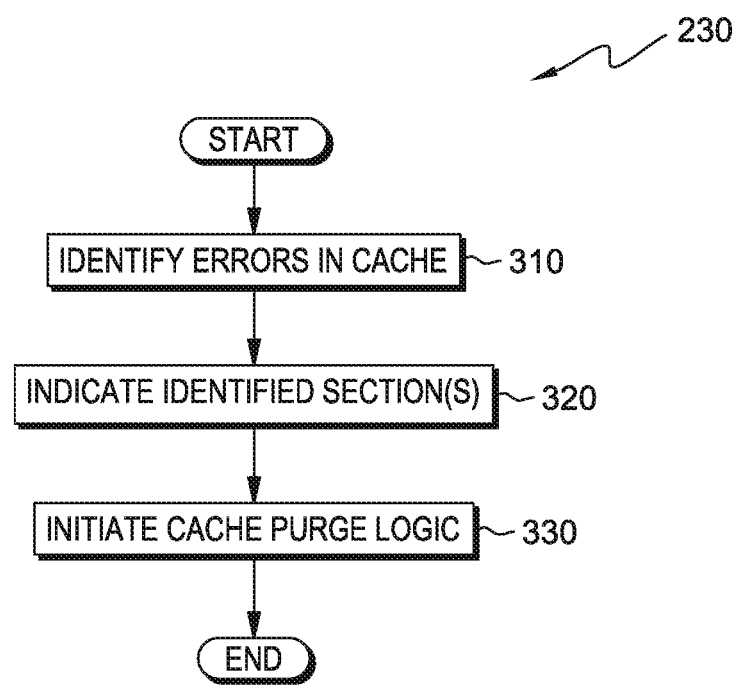
FIG. 3 depicts a flowchart of the steps of monitoring logic executing within the data processing environment of FIG. 1, for monitoring cache for errors and initiating cache purge logic, in accordance with one embodiment of the present invention.

FIG. 3 depicts a flowchart of the steps of a monitoring logic, executing within L1 cache 130, L2 cache 135, L3 cache 140, or L4 cache 145, as shown in FIG. 2. Monitoring logic 230 operates to identify errors in a respective cache, indicate sections with errors in excess of error threshold 243, and to initiate cache purge logic 330. As described above, monitoring logic 230 may be executed by cache controller 220 which can include various state machines and/or millicode configured to perform the actions. As discussed herein, reference is made to L3 cache 140. However, the explanation may apply to L1 cache 130, L2 cache 135, and L4 cache 145, in embodiments of the invention.

In step 310, monitoring logic 230 identifies errors in the respective cache within which it resides (e.g., L1 cache 130, L2 cache 135, L3 cache 140, or L4 cache 145). As described above, L3 cache 140 may be broken up into one or more sections. Each section may be composed of one or more compartments from one or more indexes 205 within L3 cache 140. Sections may each be designated by a bit in the cache directory.

In one embodiment, monitoring logic 230 identifies errors in L3 cache 140 while a cache line (data) is being accessed from a set (compartment) 210. Monitoring logic 230 checks the data from that cache line of set 210 for any errors. Upon identifying an error, monitoring logic 230 compares the number of errors, or frequency of errors to error threshold 243. If error threshold 243 has not been exceeded, monitoring logic 230 continues to only monitor errors. If error threshold 243 has been exceeded, monitoring logic 230 indicates sections of L3 cache 140, and compartments in each index 205 of the section, which shall be taken offline (see step 320). In some embodiments, monitoring logic 230 stores information about identified errors to memory 240, such as, for example, when error threshold 243 indicates a threshold of a number of errors within a section over a specified period of time. In other embodiments, monitoring logic 230 stores the number of errors identified for each section to memory 240.

In step 320, upon recognizing that the errors in a section of L3 cache 140 exceed error threshold 243, monitoring logic 230 indicates identified sections of L3 cache 140, and compartments in each index 205 of the section, which shall be taken offline. In some embodiments, monitoring logic 230 indicates the identified sections of L3 cache 140 to cache controller 220, or alternatively, stores the identified sections to the cache directory.

In step 330, monitoring logic 230 initiates cache purge logic 235. Monitoring logic 230 may initiate cache purge logic 235 by loading cache purge logic 235, or causing cache controller 220 to load cache purge logic 235. In some embodiments, monitoring logic 230 issues a broadcast command that initiates cache purge logic 235. Cache controller 220 may then load cache purge logic 235.

Figure 4:
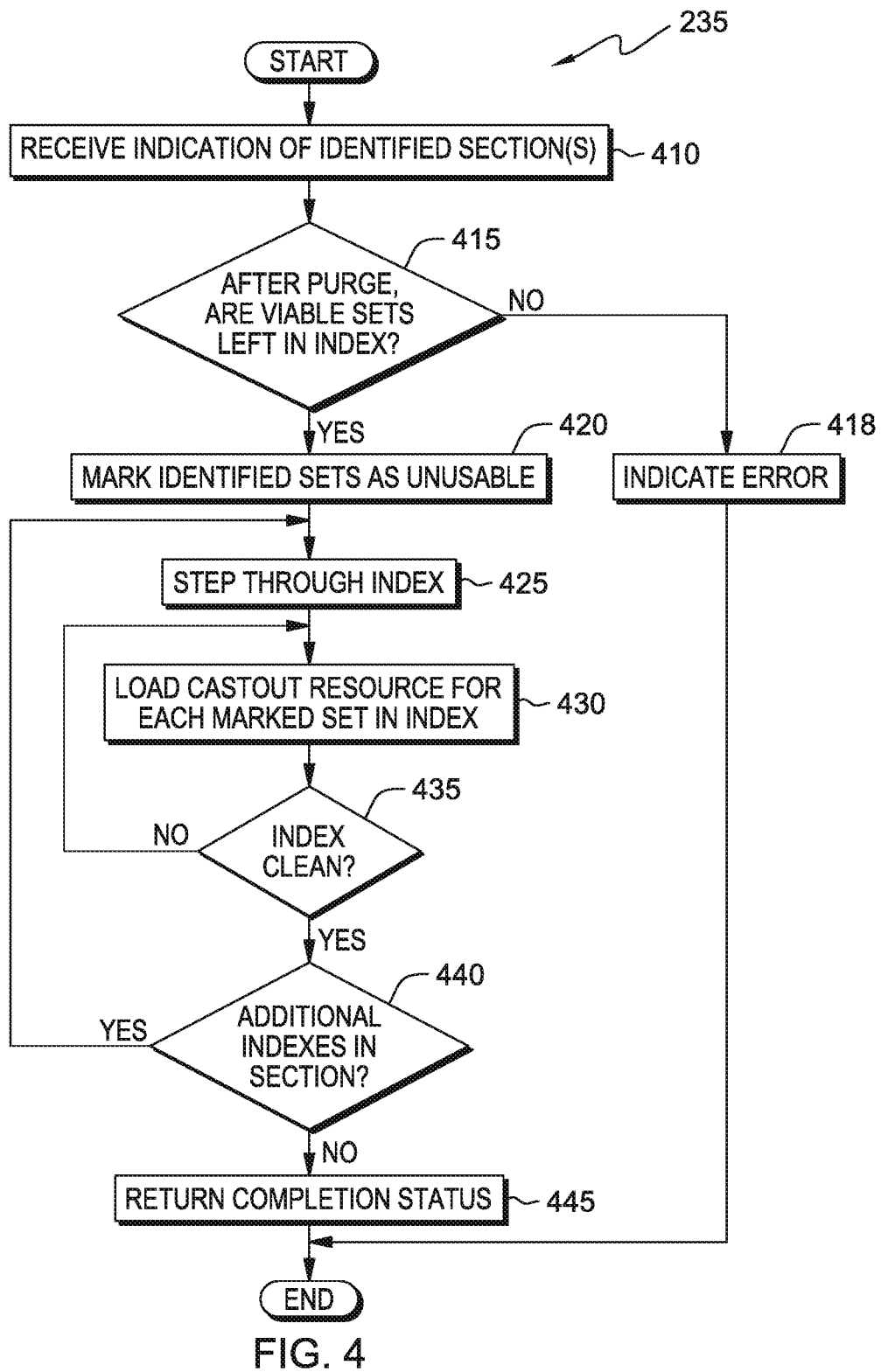
FIG. 4 depicts a flowchart of the steps of cache purge logic executing within the data processing environment of FIG. 1, for marking portions of cache as unusable and causing data in such portions to be cast out to higher level cache or memory, in accordance with one embodiment of the present invention.

FIG. 4 depicts a flowchart of the steps of a cache purge logic, executing within L1 cache 130, L2 cache 135, L3 cache 140, or L4 cache 145, as shown in FIG. 2. Cache purge logic 135 operates to step through indexes 205 and sets (compartments) 210 for the section(s) indicated by monitoring logic 230. Cache purge logic 135 marks identified sets 210 as killed (i.e., unusable for future operations in that section) and loads castout logic 250 for each set 210 marked as killed, such that castout logic 250 may castout data to higher level cache and/or memory 106 and mark each set 210 as invalid. Thereby causing the section to be empty of data and not to be used for future operations, thus the section is offline. As described above, cache purge logic 135 may be executed by cache controller 220 which can include various state machines and/or millicode configured to perform the actions.

In step 410, cache purge logic 235 receives an indication of one or more sections identified by monitoring logic 230. The indication is a set of one or more sections identified by monitoring logic 230 as having an amount, or frequency, of errors greater than error threshold 243. The indication identifies one or more sections that are unusable, as a result of the errors, and that the one or more sections should be taken offline. In one embodiment, rather than receiving the indication, when initiated by monitoring logic 230, cache purge logic 235 accesses the cache directory, and identifies selected sets 210 in addressable indexes 205 of the indicated section that are to be taken offline.

In decision 415, cache purge logic 235 determines whether viable sets (compartments) 210 will exist in each index 205, as applicable within the identified section, after purging applicable sets 210 from each index 205. In some embodiments, cache purge logic 235 compares available number of sets 241 for an index 205 and the identified sets 210 within the index 205 that are to be purged (i.e., data removed, and inaccessible for future operations) to determine the number of viable sets 210 that will exist after the purge. Cache purge logic 235 may then identify a number of viable sets 210 that will exist after the purge, and compares the number, for each index 205, to minimum number threshold 242. Cache purge logic 235 may determine whether viable sets 210 will exist in an index 205 after purging applicable sets 210 from the index 205 by identifying whether the number of viable sets 210 that will exist after the purge exceeds minimum number threshold 242. If the number of viable sets 210 that will exist after the purge is equal to or exceeds minimum number threshold 242, cache purge logic 235 will determine that a viable number of sets 210 will exist in the index 205 after purging applicable sets 210 from the index 205. If the number of viable sets 210 that will exist after the purge is below minimum number threshold 242, cache purge logic 235 will determine that a viable number of sets 210 will not exist in the index 205 after purging applicable sets 210 from the index 205. If cache purge logic 235 determines that viable sets 210 will exist in each index 205 after purging applicable sets 210 from indexes 205 (decision 415, yes branch), cache purge logic 235 marks each identified set 210 as unusable within the cache directory (see step 420). If cache purge logic 235 determines that viable sets 210 will not exist in each index 205 after purging applicable sets 210 from indexes 205 (decision 415, no branch), cache purge logic 235 indicates an error to cache controller 220 (see step 418), or to appropriate state machines or millicode of cache controller 220.

In step 418, cache purge logic 235 generates and/or indicates an error to cache controller 220, or appropriate state machines and/or millicode of cache controller 220. The error indicates that a viable number of sets 210 that will exist after purging applicable sets 210 from indexes 205 from the identified section will be lower than minimum number threshold 242. In some embodiments, the error indicates that cache purge logic 235 attempted to take offline an entire index 205, thus making the entire index 205 inaccessible for future operations. Upon returning such an error, the process is complete.

In step 420, cache purge logic 235 marks identified sets 210 within the section as unusable for future operations (i.e., kills the identified sets 210) within the cache directory. A set 210 marked as killed within the cache directory is identified as unusable for future operations. The cache directory may be accessed and sets 210 marked killed will not be selected when a set 210 needs to be selected for a new operation in L3 cache 140 (or as applicable, L1 cache 130, L2 cache 134, and/or L4 cache 145). However, cache lines (i.e., data) stored to sets 210 marked as killed, but not yet invalidated (see step 430), are still accessible by processors (e.g., processor 104, core 125). This allows cache purge logic 235, and castout logic 250 to operate without quiescing computing device 100.

In step 425, cache purge logic 235 steps through index 205. Cache purge logic 235 steps through each index 205 of the identified section, one at a time, by keeping the section index bits the same, while incrementing other bits. In some embodiments, more specifically, cache purge logic 235 steps through each index 205 and each compartment marked as killed within the cache directory. Initially, cache purge logic 235 steps through a first index 205. However, if the identified section contains multiple indexes 205, cache purge logic 235 steps through other indexes 205 upon the completing a previous index 205.

In step 430, cache purge logic 235 loads a castout resource for each set 210 marked as killed in the cache directory. In general, the castout resource acts to, in parallel with the operation of cache purge logic 235, evict the cache line (data) from the marked sets 210 to higher level cache (e.g., L2 cache 135, L3 cache 140, L4 cache 145) or memory 106 and to invalidate (or delete) the marked sets 210. In some embodiments, castout logic 250 operates to evict the cache line (data) from the marked sets 210 to higher level cache or memory 106 and to invalidate (or delete) the marked sets 210. Castout logic 250 may incrementally evict data from each set 210 within the current index 205 individually, as cache purge logic 235 steps through the particular index 205 and loads castout logic 250.

In decision 435 cache purge logic 235 determines whether the current index 205 is clean. In this context, the current index 205 is clean once all marked sets 210 in the current index 205 have been invalidated by castout logic 250. Cache purge logic 235 may monitor castout logic 250 to identify the completion status of castout logic 250 in evicting cache lines (data) from marked sets 210 and invalidating each set 210. In other embodiments, cache purge logic 235 may access the cache directory to determine whether castout logic 250 has marked each marked set 210 as invalid. If cache purge logic 435 determines that the current index 205 is not clear (decision 435, no branch), cache purge logic 435 continues to load castout resources (e.g., castout logic 250) for any additional marked sets 210 in the current index 205 (see step 430). If cache purge logic 235 determines that the current index 205 is clean (decision 435, yes branch), cache purge logic determines whether additional indexes 205 exist within the identified section(s) (see decision 440)

In decision 440, cache purge logic 235 determines whether there are additional indexes 205 in the identified section to step through. As previously described, the section may identify one or more indexes 205. If cache purge logic 235 determines there is one or more additional indexes 205 (decision 440, yes branch), cache purge logic 235 steps through the next index 205 (see step 425). If cache purge logic 235 determines there are no more additional indexes 205 (decision 440, no branch), cache purge logic 235 returns completion status to cache controller 220 (see step 445).

In step 445, cache purge logic 235 returns completion status to cache controller 220, or applicable state machines and/or millicode. In some embodiments, cache purge logic 235 persists until cache purge logic 235 receives acknowledgement of receipt of the completion status. Completion status may indicate sets 210 of each index 205 in the identified section that have been invalidated, and therefore disabled. In some embodiments, the entire section may be invalidated. In other embodiments, only a portion of the section, namely error-prone compartments within the section, are invalidated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for taking corrupt portions of cache offline during runtime, the computer program product comprising:

one or more computer readable hardware storage media and program instructions stored on the one or more computer readable hardware storage media, the program instructions comprising:

program instructions to receive a notification of a section of a cache to be taken offline, wherein the section includes one or more sets in one or more indexes of the cache;

program instructions to associate an indication with each set of the one or more sets in a first index of the one or more indexes, wherein the indication marks the respective set as unusable for future operations, wherein each indication is accessible for reference when an operation requires selection of a set in the first index of the cache, and wherein upon associating the indication with each set of the one or more sets in the first index, each set of the one or more sets in the first index remains accessible to one or more processors;

prior to associating the indication with each set of the one or more sets in the first index, program instructions to determine that a number of viable sets in the first index, not included in the section, exceeds a minimum number of sets threshold for the first index;

program instructions to purge data from the one or more sets in the first index of the cache, wherein program instructions to purge the data from the one or more sets in the first index of each cache comprise program instructions to store the data to a higher level memory;

program instructions to mark each set of the one or more sets in the first index as invalid;

program instructions to determine that the section includes an additional one or more sets in a second index of the one or more indexes;

program instructions to increment to the second index of the one or more indexes;

program instructions to determine that a number of viable sets in the second index, not included in the section, does not exceed a minimum number of sets threshold for the second index; and program instructions to generate an error.

* * * * *